(12) United States Patent
Buering et al.

(10) Patent No.: US 11,267,509 B2
(45) Date of Patent: Mar. 8, 2022

(54) STEERING DEVICE

(71) Applicant: Robert Bosch GmbH, Stuttgart (DE)

(72) Inventors: Hendrik Buering, Schwäbisch Gmünd (DE); Wolfgang Abele, Spraitbach (DE); Andreas Kruttschnitt, Heidenheim (DE); Arnulf Heilig, Schwäbisch Gmünd (DE); Ralf Redemann, Essingen (DE); Vitali Haag, Ruppertshofen (DE); Ossmane Krini, Schwäbisch Gmünd (DE); Stefan Scherb, Backnang (DE); Arthur Rupp, Hüttlingen (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 16/605,167

(22) PCT Filed: Apr. 26, 2018

(86) PCT No.: PCT/EP2018/060654
§ 371 (c)(1),
(2) Date: Oct. 14, 2019

(87) PCT Pub. No.: WO2018/206295
PCT Pub. Date: Nov. 15, 2018

(65) Prior Publication Data
US 2021/0101640 A1 Apr. 8, 2021

(30) Foreign Application Priority Data

May 8, 2017 (DE) ..................... 10 2017 207 716.6

(51) Int. Cl.
*B62D 15/02* (2006.01)
*B62D 3/02* (2006.01)
*G01B 7/04* (2006.01)

(52) U.S. Cl.
CPC .......... *B62D 15/0225* (2013.01); *B62D 3/02* (2013.01); *B62D 15/0235* (2013.01); *G01B 7/046* (2013.01)

(58) Field of Classification Search
CPC .. B62D 15/0225; B62D 15/0235; B62D 3/02; G01B 7/046
See application file for complete search history.

(56) References Cited

U.S. PATENT DOCUMENTS 4,853,672 A * 8/1989 Yasuda .............. B62D 15/0225
340/465
5,163,529 A 11/1992 Clement
(Continued)

FOREIGN PATENT DOCUMENTS

CN 103175641 A 6/2013
CN 106546201 A 3/2017
(Continued)

OTHER PUBLICATIONS

International Search Report corresponding to PCT Application No. PCT/EP2018/060654, dated Jul. 13, 2018 (German and English language document) (7 pages).

*Primary Examiner* — Minnah L Seoh
*Assistant Examiner* — Michael R Stabley
(74) *Attorney, Agent, or Firm* — Maginot, Moore & Beck LLP

(57) ABSTRACT

A steering device for a vehicle includes a steering rod and at least one drive unit, wherein the steering rod can be displaced along its longitudinal extent by the drive unit. The steering device also includes at least one first sensor device for determining a displacement position of the steering rod. The steering rod, as seen along its longitudinal extent, (Continued)

exhibits at least one change in its cross section, in particular diameter, wherein the first sensor device is designed to sense the change.

14 Claims, 3 Drawing Sheets

(56) References Cited

U.S. PATENT DOCUMENTS

| | | | |
|---|---|---|---|
| 5,314,036 A | 5/1994 | Kato et al. | |
| 5,477,473 A | 12/1995 | Mandl et al. | |
| 6,079,513 A * | 6/2000 | Nishizaki | B62D 5/006 |
| | | | 180/402 |
| 7,954,827 B2 * | 6/2011 | Maruyama | B62D 17/00 |
| | | | 280/5.522 |
| 8,302,492 B2 * | 11/2012 | Shimizu | G01L 3/102 |
| | | | 73/862.333 |
| 2011/0202239 A1 * | 8/2011 | Maruyama | B62D 5/0481 |
| | | | 701/41 |
| 2015/0121709 A1 * | 5/2015 | Sudale | G01M 17/06 |
| | | | 33/203.18 |

FOREIGN PATENT DOCUMENTS

| | | |
|---|---|---|
| DE | 33 47 052 A1 | 7/1985 |
| DE | 198 37 340 A1 | 3/2000 |
| DE | 101 61 892 A1 | 10/2002 |
| DE | 10 2004 042 243 A1 | 9/2005 |
| DE | 10 2013 209 459 A1 | 11/2013 |
| DE | 10 2012 023 980 A1 | 6/2014 |
| DE | 10 2013 000 145 A1 | 7/2014 |
| EP | 0 170 723 A2 | 2/1986 |
| FR | 3 006 977 A1 | 12/2014 |
| GB | 2 194 201 A | 3/1988 |
| KR | 96-21309 U | 7/1996 |

* cited by examiner

STEERING DEVICE

This application is a 35 U.S.C. § 371 National Stage Application of PCT/EP2018/060654, filed on Apr. 26, 2018, which claims the benefit of priority to Serial No. DE 10 2017 207 716.6, filed on May 8, 2017 in Germany, the disclosures of which are incorporated herein by reference in their entirety.

The disclosure relates to a steering device for a vehicle, having a steering rod and at least one drive unit, it being possible for the steering rod to be displaced by way of the drive unit in its longitudinal extent, and having at least one first sensor device for determining a slide position of the steering rod.

BACKGROUND

Steering devices of the type mentioned at the outset are already known from the prior art. They usually have a steering rod, in particular for a rear wheel axle, and at least one drive unit, by way of which the steering rod can be displaced in its longitudinal extent. Furthermore, it is known, in the case of steering devices of this type, to determine a current slide position of the steering rod in the longitudinal direction by means of a sensor device. A calibration is usually carried out for a steering device of this type. Here, in particular, the sensor device, the steering rod and/or the drive unit are measured and are adjusted to one another in an optimum manner, to which end the steering rod is usually displaced to a maximum extent into an end slide position. The calibration serves, in particular, for it being possible for the slide position to be determined correctly by way of the sensor device during the following normal operation. In particular, the knowledge of the precise slide position is of importance for the actuation of the drive unit, because the drive unit can be actuated precisely only when the slide position is known, in order to assist the driver during a steering operation or to automatically carry out a steering operation precisely, since the steering angle at the wheels of the motor vehicle which are steered by way of the steering rod results directly from the slide position of the steering rod.

SUMMARY

It is provided that, as viewed in the longitudinal extent, the steering rod has at least one change in its cross section, in particular diameter, the first sensor device being configured to detect the change. The advantage here is that the slide position of the steering rod can be detected directly and even during running operation by way of detection of the change in the cross section. As a result, in particular, a calibration or adaptation of the first sensor device, steering rod and/or drive unit is no longer necessary, for example, in the case of a first start-up of the first sensor device. This saves time and costs which arise, for example, as a consequence of the calibration and/or a recalibration which can become necessary on account of mechanical loading or material aging. The first sensor device can be arranged/is arranged preferably in a fixed manner on the vehicle or in a stationary manner at a predefinable and therefore known position in or on the vehicle, with the result that the first sensor device and the steering rod which can be displaced in its longitudinal extent, in particular the change in its cross section, can be moved relative to one another. Here, the arrangement of the first sensor device such that it is fixed on the vehicle and, in particular, is non-displaceable ensures that the change in the cross section and therefore the slide position can be detected reliably. In the case of an installation or mounting of the steering device in the vehicle, the first sensor device and the steering rod are preferably adapted to one another in such a way that they are oriented in a reference or starting position with respect to one another. The reference position is distinguished, in particular, by the fact that the steering rod is oriented/arranged in a center position, the center position corresponding to a straight ahead driving position of the steered wheels of the vehicle, and that the first sensor device detects that change in the cross section which is assigned to the center position. This ensures that, starting from the center position, a displacement of the steering rod takes place relative to the center position, for example in the case of a steering intervention by way of a user of the vehicle. As a result, it is possible to determine the slide position and also a slide direction starting from the center position in a particularly precise manner. The steering rod is preferably assigned to a rear axle or a front axle of the vehicle.

It is provided in accordance with one preferred development that the first sensor device is configured to detect the change in a contactless manner. The advantage here is that the contactless detection avoids wear of material of the steering rod and/or the first sensor device. In particular, this increases service life of the steering rod and/or the first sensor device, and ensures reliable and secure operation of the steering device. The steering rod is preferably arranged in a housing, for example a steering gear housing. The first sensor device is preferably arranged in a stationary and/or non-rotational manner in or on the housing, for example on a circumferential inner wall of the steering gear housing. The first sensor device is preferably an optical sensor, for example a laser sensor, a magnetic field sensor, in particular a Hall sensor, or a TMR (tunnel magnetoresistance) sensor. The Hall sensor is configured, for example, to generate at least one sensor signal based on the Hall effect in a manner which is dependent on a spacing from the steering rod, in particular a magnetic field which changes in the case of a change in the spacing. The magnetic field can be generated, for example, by way of a permanent magnet or electromagnet which can be assigned to the Hall sensor or the steering rod. The spacing of the steering rod from the Hall sensor or the first sensor device changes, in particular, in the case of a displacement of the steering rod which has the change in the cross section relative to the Hall sensor. Thus, for example, the spacing between the steering rod and the Hall sensor in the region of the steering rod in which the steering rod has the change in the cross section, in particular diameter, is different than in the region of the steering rod in which the steering rod does not have a change in the cross section. The sensor signal can preferably be received and evaluated by way of a control unit which is assigned to the first sensor device. To this end, the first sensor device, in particular the control unit, preferably has software, in particular a software algorithm, for determining the slide position and/or a slide direction.

It is preferably provided that the steering rod has at least one first section with a first diameter and at least one second section with a second diameter. This results in the advantage that the steering rod has a mechanical marking on account of the different diameters, by means of which mechanical marking an even more precise determination of the slide position is possible. If, for example, the first diameter of the first section is smaller than the second diameter of the second section, the sensor signal which is detected by way of the Hall sensor will, for example, be different in the first section than in the second section. In a manner which is dependent on the sensor signal, it is therefore possible to determine a slide direction of the steering rod, in particular relative to the change in the cross section or the center position. Here, the change in the cross section or the center position is realized by way of the transition between the first section and the second section. As a result, it is possible, for example on the basis of the differing sensor signals of the first and the second section, to determine a slide direction with respect to the center position, in particular, by way of the control unit. Furthermore, it is advantageous that the steering rod itself has the change in the diameter or the cross section. This makes, in particular, a simple and inexpensive construction of the steering device, in particular of the steering rod, possible. The first section and the second section are preferably configured in one piece with one another. As an alternative, the first and the second section are of separate configuration. The first section and the second section preferably in each case have the same length or different lengths.

It is particularly preferably provided that the steering rod has at least one circumferential groove, the circumferential groove being arranged, in particular, in a first circumferential face of the first section and/or in a second circumferential face of the second section. The advantage here is that the circumferential groove can be produced simply and leads to two cross-sectional changes. In addition, as a result, a marking or mechanical coding is configured in the steering rod itself, which marking or mechanical coding makes a particularly precise determination of the slide position possible. The steering rod preferably has a constant cross section, in particular diameter, the circumferential groove being configured in a circumferential face of the steering rod. The circumferential groove is preferably made in the circumferential face by means of a machining method which removes material, for example turning, milling or grinding.

The steering rod, in particular the first section and/or the second section, preferably has a plurality of circumferential grooves, that is to say grooves which extend over the entire circumference of the steering rod. The advantage here is that the steering rod has a plurality of markings in the longitudinal direction, by way of which markings the slide position and, in particular, the slide direction can be determined even more precisely. It is therefore possible, in particular, to configure a complex mechanical coding which has a plurality of markings on the steering rod. That change in the cross section which is assigned to the center position is preferably realized by way of one predefinable circumferential groove of the plurality of circumferential grooves. This makes it possible, for example, to detect a number of circumferential grooves in the case of a displacement of the steering rod starting from the center position, with the result that a displacement travel and/or a distance from the center position can be determined in a manner which is dependent on the number of detected circumferential grooves.

It is provided in accordance with one preferred development that the first section and/or the second section are/is formed by way of at least one sleeve which is arranged on the steering rod. The advantage here is that the first and the second diameter of the steering rod can be realized in a simple way. Machining of the steering rod, for example by way of a method which removes material, is therefore not necessary. The sleeve is preferably configured such that it can be pushed onto the steering rod, or is pushed onto said steering rod. Furthermore, the sleeve is preferably connected/can be connected by means of a joining process to the steering rod in an integrally joined manner. As an alternative or in addition, it is provided that the sleeve is connected/can be connected to the steering rod in a non-positive and/or positively locking manner. The change in the cross section, in particular diameter, is preferably realized by way of the transition between the diameter of the steering rod and the diameter of the sleeve.

It is particularly preferably provided that the respective sleeve has the at least one circumferential groove. The advantage here is that the sleeve itself has a marking and therefore a mechanical coding. The at least one circumferential groove is preferably configured on the sleeve even before mounting of the sleeve on the steering rod. This ensures that the sleeve can be configured such that it can be premounted on the steering rod with a mechanical coding which, in particular, can be predefined.

It is provided in accordance with one preferred development that the respective sleeve has a plurality of circumferential grooves. The advantage here is that the sleeve has or can have a complex mechanical coding which is formed by way of a plurality of circumferential grooves. This ensures an increase in the accuracy for detecting or determining the slide position and/or slide direction.

It is preferably provided that the plurality of circumferential grooves are configured with an identical or different width. The advantage here is that any desired mechanical coding can be realized on the steering rod and/or the sleeve, which mechanical coding is defined by way of the width of the circumferential grooves. It is preferably provided that it can be determined whether the slide position is moving away from the center position or is approaching it in a manner which is dependent on an increase or decrease in a width of at least two circumferential grooves which follow one another. If, for example, the width of in each case two circumferential grooves which are adjacent in the longitudinal extent increases, starting from the center position, it is possible, in particular, to determine by way of the first sensor device or the control unit that the steering rod is approaching the center position when the detected width of circumferential grooves which are adjacent in each case in the longitudinal extent decreases again or becomes narrower. By way of the detection of an increase or decrease in the width, it is therefore possible, in particular, to determine the slide position and/or slide direction when the widths of the circumferential grooves are unknown. As an alternative, it is possible, in the case of a known width of a circumferential groove or in the case of known widths of the circumferential grooves, to determine the slide position and/or slide direction precisely by way of the detection of the width of a respective circumferential groove. The known widths can be stored or are stored preferably in the control unit, with the result that the known widths can be compared with the widths which result from the detected sensor signals.

It is provided in accordance with one advantageous development that the plurality of circumferential grooves are configured with an identical or different depth. Here, "depth" means, in particular, a radial depth in relation to the steering rod and/or the sleeve. It is also preferably provided here that it can be determined whether the slide position is moving away from the center position or is approaching it in a manner which is dependent on an increase or decrease in a depth of at least two circumferential grooves which follow one another.

It is preferably provided that the plurality of circumferential grooves are spaced apart from one another at the same spacing or a different spacing. The advantage here is that any desired mechanical coding which is defined by way of the spacings of the circumferential grooves can be realized on the steering rod and/or the sleeve. It is preferably provided that it can be determined whether the slide position is moving away from the center position or is approaching it in a manner which is dependent on an increase or decrease in a spacing of at least three circumferential grooves which follow one another. If, for example, the spacing of at least three circumferential grooves which follow one another in the longitudinal extent is increasing, starting from the center position, it is possible, in particular, to determine by way of the first sensor device or the control unit that the steering rod is approaching the center position when the detected spacing of the circumferential grooves which follow one another in the longitudinal extent decreases again. It is assumed here that the movement speed of the steering rod is known. By way of the detection of an increase or decrease in the spacings, it is therefore possible, in particular, to determine the slide position and/or slide direction if the spacings of the circumferential grooves are unknown. As an alternative, it is possible, in the case of known spacings of the circumferential grooves, to determine the slide position and/or slide direction precisely by way of the detection of the spacing of at least three circumferential grooves which follow one another. The known spacings can be stored or are stored preferably in the control unit, with the result that the known spacings can be compared with the spacings which result from the detected sensor signals.

It is provided in one preferred embodiment that the width of the respective circumferential grooves and/or the spacing of respectively adjoining circumferential grooves increase/ increases or decrease/decreases in the longitudinal extent of the steering rod. The advantage here is also that a mechanical coding is realized or can be realized which ensures a particularly accurate determination of the slide position and/or slide direction. The mechanical coding is preferably arranged centrally or eccentrically on the steering rod. The mechanical coding preferably has a central or centrally arranged change in the diameter, the central change in the diameter preferably being assigned to the center position. The mechanical coding which is arranged on the steering rod preferably extends, starting from the central change in the diameter and as viewed in the longitudinal direction of the steering rod, both in the one, in particular first, direction and in the other, in particular second, direction. Here, the one or first direction is, for example, the direction to the left of the central change in the diameter, and the other or second direction is the direction to the right thereof. The steering device preferably has at least two first sensor devices. Here, a first sensor device is preferably assigned to the first direction, and another first sensor device is assigned to the second direction. It is provided in accordance with a first example that the width of the respective first circumferential grooves and/or the spacing of in each case two adjacent first circumferential grooves increase/increases in the longitudinal extent of the steering rod in the first direction for a predefinable first number of first circumferential grooves, and the width of the respective second circumferential grooves and/or the spacing of in each case two adjacent second circumferential grooves decrease/decreases in the longitudinal extent of the steering rod in the second direction. As viewed in the longitudinal extent of the steering rod, for example as viewed from the first to the second direction, the width of the circumferential grooves and/or the spacing of in each case two adjacent circumferential grooves therefore decrease/decreases. It is provided in accordance with a second example that the width of the respective first circumferential grooves and/or the spacing of in each case two adjacent first circumferential grooves increase/increases in the longitudinal extent of the steering rod in the first direction for a predefinable first number of first circumferential grooves, and the width of the respective second circumferential grooves and/or the spacing of in each case two adjacent second circumferential grooves increase/increases in the longitudinal extent of the steering rod in the second direction for a number of second circumferential grooves which is equivalent to the first number, in a manner which is analogous with respect to the first direction. The first circumferential grooves and the second circumferential grooves are therefore arranged symmetrically in relation to the central change in the diameter. Here, the axis of symmetry is preferably realized by way of an axis which is arranged at the location of the central change in the diameter or the center position perpendicularly with respect to the longitudinal axis of the steering rod.

It is particularly preferably provided that the drive unit is configured as an electric motor. This ensures that the steering rod can be displaced reliably and in a simple way. The electric motor preferably has a stator and a rotor. It is preferably provided that the rotor is operatively connected to an actuating mechanism, for example a threaded spindle drive or a belt drive. The actuating mechanism is preferably configured to convert a rotational movement of the rotor into a linear movement of the steering rod, with the result that the steering rod is displaced in its longitudinal extent.

The steering device preferably has at least one second sensor device for detecting a rotor position of the electric motor. This results in the advantage that the center position and/or the slide position of the steering rod can be determined particularly accurately. A setpoint rotor position of the rotor is preferably detected by way of the second sensor device in the reference position, in the case of which the steering rod is oriented in the center position. The second sensor device is preferably connected electrically to the control unit for the transmission of the detected rotor position. The setpoint rotor position can preferably be stored in the control unit. In order to determine the center position of the steering rod particularly accurately after a displacement of the steering rod, a current rotor position which is detected by way of the second sensor device is preferably compared with the setpoint rotor position. The fact that the center position has been reached is detected, in particular, when the detected current rotor position corresponds at least substantially to the setpoint rotor position. In addition, in order to determine the center position, the control unit monitors, in particular, whether the first sensor device detects that change in the cross section which is assigned to the center position. The electric motor, in particular the rotor, is optionally assigned a revolution counter which is configured to detect complete revolutions, that is to say 360° revolutions, of the rotor. A complete revolution is preferably detected or counted starting from the reference position and/or center position. It is preferably provided that the revolution counter is configured to store a number of detected revolutions or to transmit it by means of an electric connection to the control unit, in which the number of detected revolutions can preferably be stored. The detection of the revolutions by means of the revolution counter ensures that, in particular starting from the center position, the slide position and/or a displacement travel of the steering rod can be determined in addition or as an alternative to the determination by means of the first and/or second sensor device.

The method for operating a steering device for a vehicle disclosed herein is distinguished by the fact that, as viewed in the longitudinal extent, at least one change in its cross section, in particular diameter, is configured on the steering rod, the change being detected by way of the first sensor device. The abovementioned advantages result from this. Further advantages and preferred features result, in particular, from the above description and from the disclosure below.

BRIEF DESCRIPTION OF THE DRAWINGS

In the following text, the disclosure is to be described in greater detail on the basis of the drawings, in which, in the following text.

DETAILED DESCRIPTION

Figure 1:
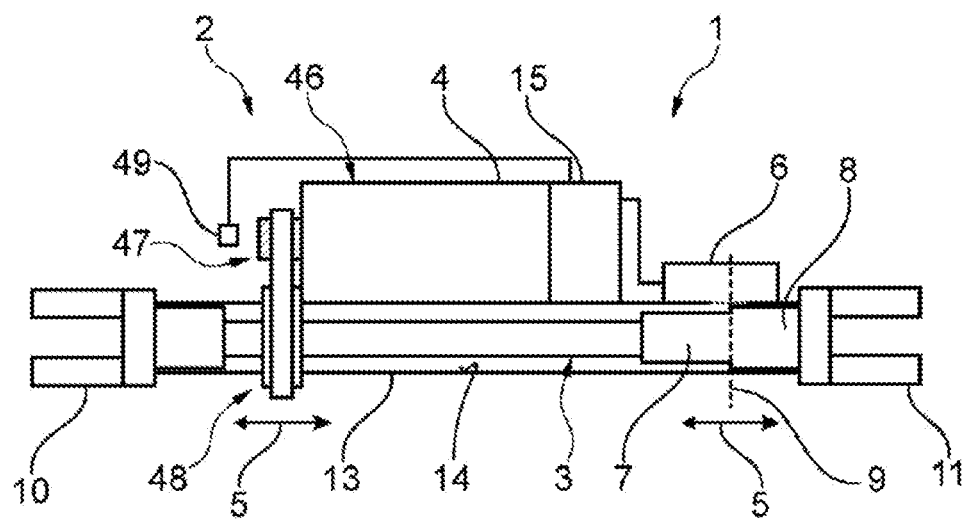
FIG. 1 shows a steering device for a vehicle in a simplified illustration.

FIG. 1 shows a steering device 1 for a rear axle of a vehicle 2 (not shown in greater detail here), in particular of a motor vehicle, having a steering rod 3 and having at least one drive unit 4 which is configured, in particular, as an electric motor with a stator 46 and a rotor 47 or a rotor shaft. It is preferably provided that the rotor 47 is operatively connected to an actuating mechanism, for example a threaded spindle drive or a belt drive 48. The actuating mechanism is preferably configured to convert a rotational movement of the rotor 47 into a linear movement of the steering rod 3, with the result that the steering rod 3 can be displaced by way of the drive unit 4 in its longitudinal extent (shown by way of arrows 5).

In addition, the steering device 1 has at least one sensor device 6 for determining a slide position of the steering rod 3. Here, the slide position is dependent on the displacement of the steering rod 3 in the direction of its longitudinal extent. As viewed in the longitudinal extent, the steering rod 3 has at least one change in its cross section, in particular diameter. The sensor device which is arranged, in particular, fixedly on the vehicle is configured to detect the change in the cross section. In the present case, the sensor device 6 and the steering rod 3 are oriented in a reference or starting position with respect to one another. The reference position is distinguished, in particular, by virtue of the fact that the steering rod 3 is oriented in a center position 9, the center position 9 corresponding to a straight ahead driving position of the steerable wheels which can be arranged on wheel supports 10, 11 of the steering rod 3. This ensures that, starting from the center position 9, a displacement of the steering rod 3 takes place relative to the center position 9, for example as a consequence of a steering intervention by way of a user of the vehicle 2.

In addition, a second sensor device 49 is preferably provided for detecting a rotor position of the electric motor or of the rotor 47. To this end, the second sensor device 49 is preferably arranged fixedly on the vehicle or in a stationary manner at a predefinable and therefore known position in or on the vehicle 2 in order to detect the rotor 47, in particular an end side of the rotor 47 or the rotor shaft. The rotor 47, in particular its end side, preferably has at least one magnet, for example a permanent magnet, the second sensor device 49 being configured to detect the magnetic field, in particular a change in the magnetic field in the case of a rotation of the rotor 47. Whereas the second sensor device 49 is illustrated as being arranged outside the drive unit 4 in the present exemplary embodiment, it is preferably provided that the sensor device 49 is protected within and/or in the housing in a manner which is assigned in a stationary manner on the housing of the drive unit 4, the rotor shaft or the rotor. It goes without saying, however, that an external arrangement is also fundamentally possible, as shown in FIG. 1. The second sensor device 49 is, in particular, an internal rotor position sensor which is necessary in any case for actuating the electric motor. As a result, the attachment of an additional sensor for detecting the rotor position is not necessary, and the data which are available in any case with respect to the rotor position can be used by the control unit.

The steering rod 3 preferably has at least one first section 7 with a first diameter and at least one second section 8 with a second diameter. In the present case, the first diameter is smaller than the second diameter. The change in the diameter is preferably realized by way of the transition between the first and the second diameter. Furthermore, the steering rod 3 can be assigned/is assigned to a front axle and/or a rear axle of the vehicle 2. In the present exemplary embodiment, the steering rod 3 is assigned to the rear axle of the vehicle 2.

The steering rod 3 is preferably manufactured from a metal, the first section 7 and the second section 8 preferably being configured in one piece. The steering rod 3 is arranged in a housing 13, for example a steering gear housing. The sensor device 6 is arranged/can be arranged preferably in or on the housing 13 in a stationary manner. In the present case, the sensor device is arranged on a circumferential outer wall of the housing 13 in a manner which is spaced apart from the steering rod 3.

The first sensor device 6 preferably detects the change in the cross section, in particular diameter, without contact. The first sensor device 6 is preferably an optical sensor, for example a laser sensor, a magnetic field sensor, in particular a Hall sensor, or a TMR switch or a TMR sensor. The second sensor device 49 is configured, in particular, as a rotor position sensor or magnetic field sensor.

The first sensor device 6 and the second sensor device 49 are preferably connected electrically to a control unit of the drive unit 4, with the result that detected sensor signals of the first sensor device 6 and/or of the second sensor device 49 can be transmitted to the control unit 15. The control unit 15 is preferably configured to evaluate the sensor signals, in particular, by means of a software program or a software algorithm, and/or to store them, for example, in a data storage unit which is assigned to the control unit 15. The evaluation, in particular, of the sensor signals of the first sensor device 6 by means of the algorithm makes it possible to determine, for example, the slide position of the steering rod 3 or else a slide direction, in which the steering rod 3 is being displaced, in particular, relative to the center position 9 or the change in the diameter. In order that the position of the steering rod in the center position 9 is known particularly precisely and can therefore be actuated particularly precisely if required, the rotor position of the rotor 47 in the reference or starting position is preferably detected and is stored as a setpoint rotor position in the control unit 15 and/or the data storage unit.

In addition, the control unit 15 is preferably configured to actuate the drive unit 4 electrically, in order to assist a manual steering operation by way of a reduction of a manual steering force on a steering wheel (not shown here) or else to carry out an automated steering operation by means of the drive unit 4. This ensures that the steering rod 3 can be displaced automatically into the center position 9 if required by means of the drive unit 4.

Figure 2:
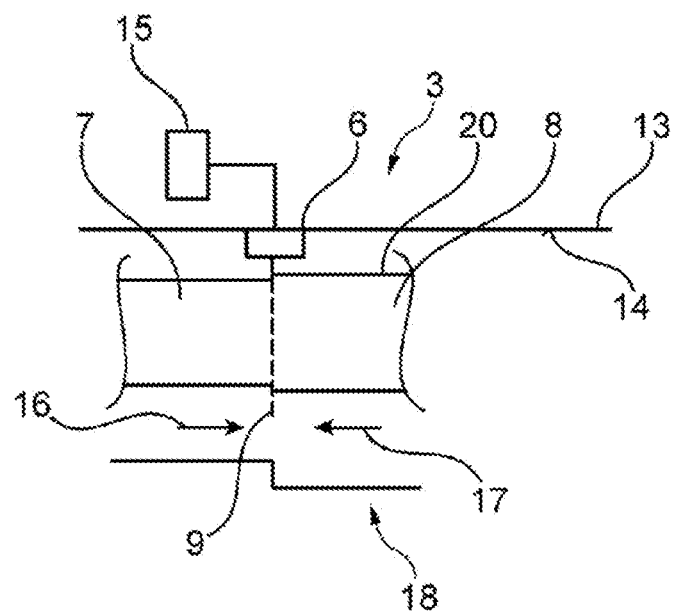
FIG. 2 shows a detail of a steering rod of the steering device, which steering rod has a change in its cross section, in a first embodiment.

FIG. 2 shows a detail of the steering rod 3, in particular the first section 7 with a first diameter and the second section 8 with a second diameter. In the present case, the steering rod 3 can be displaced along the arrow 16 to the right and along the arrow 17 to the left.

In accordance with the exemplary embodiment, the first sensor device 6 is configured as a Hall sensor and is arranged on a circumferential inner wall 14 of the housing 13. The Hall sensor is preferably configured to generate a sensor signal based on the Hall effect in a manner which is dependent on a spacing from the steering rod 3, in particular a magnetic field which changes in the case of a change in the spacing. In the present case, the magnetic field is generated by way of a permanent magnet (not shown here) which is assigned, in particular, to the Hall sensor.

In a manner which is dependent on the magnetic field which changes in the case of a change in the spacing, the Hall sensor or the first sensor device 6 detects a sensor signal, represented by way of a sensor signal profile 18, which can be transmitted to the control unit 15. In the present case, the first sensor device 6 detects the first diameter of the first section 7 or the second diameter of the second section 8, depending on the slide position of the steering rod 3, the first sensor device 6 monitoring a spacing from the steering rod 3 to this end, which spacing results from the slide position of the steering rod 3 and the section which then lies opposite the first sensor device 6. The transition between the first and the second diameter is preferably assigned to the center position 9, with the result that the center position 9 is determined or recognized in the case of a detection of the transition by way of the first sensor device 6. In addition, in the case of a displacement of the steering rod 3, a change in the rotor position or the actual rotor position is detected by way of the second sensor device 49, which change or actual rotor position can be transmitted or is transmitted as a sensor signal profile (not shown here) of the second sensor device 49 to the control unit 15.

Figure 3:
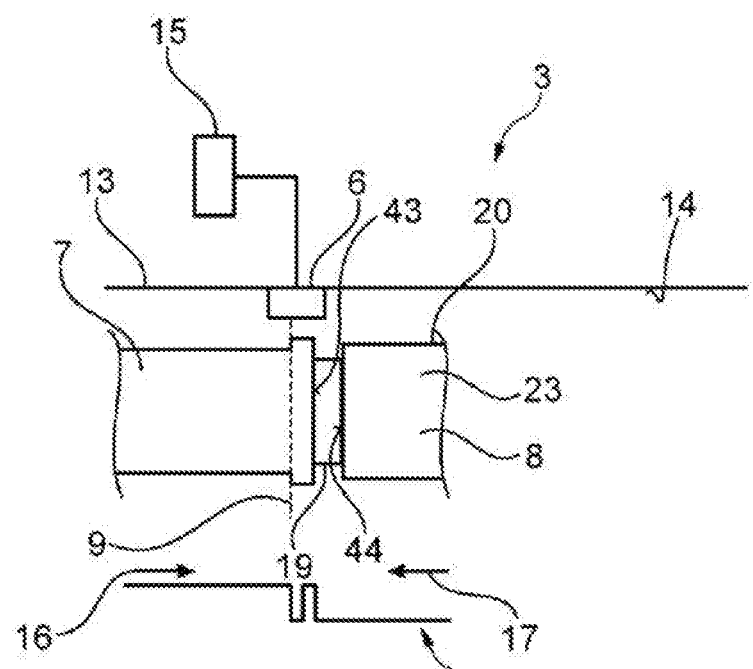
FIG. 3 shows a detail of a steering rod which has a change in its cross section, in a second embodiment.

FIG. 3 shows the already known detail of the steering rod 3, the second section 8 then having a circumferential groove 19. Here, the circumferential groove 19 is configured in a circumferential face 20 of the second section 8. As an alternative or in addition, the circumferential groove 19 is configured in a circumferential face 21 of the first section 7. The circumferential groove 19 or the change in the cross section of the steering rod 3 can be configured in/on the steering rod 3, for example, by way of machining with the removal of material, such as milling. The steering rod 3, in particular the first section 7 and/or the second section 8, preferably has the at least one or plurality of circumferential grooves 19.

Here, the steering rod 3 has a plurality of changes in the diameter, in the present case in the region of the center position 9 or the transition between the first and the second diameter, and in the region of the circumferential groove 19, in particular on the flanks 43, 44 of the circumferential groove 19. The plurality of changes in the diameter can be detected by way of the first sensor device 6, represented by way of the sensor signal profile 26, and can be transmitted to the control unit 15 for determining the slide position and/or slide direction.

It is optionally provided that the steering rod 3 itself has a constant diameter in the longitudinal extent, the second section 8 being realized or formed by way of a sleeve 23.

The sleeve 23 is configured, for example, as a cylindrical sleeve 23 which can be pushed at least in regions onto the steering rod 3. The sleeve 23 is preferably connected to the steering rod 3 in an integrally joined manner by means of a joining process. The at least one circumferential groove 19 is preferably configured in the sleeve 23.

Figure 4:
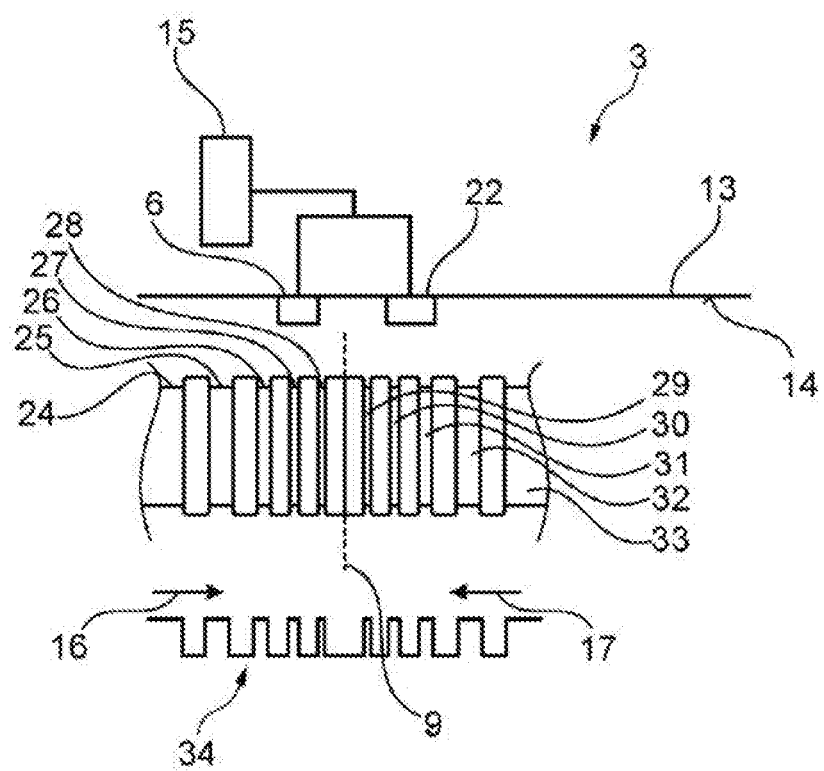
FIG. 4 shows a detail of a steering rod which has a change in its cross section, in a third embodiment.

FIG. 4 shows the steering rod 3, the steering rod 3 then having a plurality of circumferential grooves 24-33.

In the present case, the width of the respective first circumferential grooves 24-28 increases in a first direction, in particular the direction to the left of the center position 9, for a predefinable first number of first circumferential grooves 24-28. The width of the respective second circumferential grooves 29-33 likewise increases in an analogous manner with respect to those of the first direction in a second direction, in the present case the direction to the right of the center position 9, for a number of second circumferential grooves 29-33 which is equivalent to the first number of first circumferential grooves 24-28. The first circumferential grooves 24-28 and the second circumferential grooves 29-33 are therefore arranged symmetrically in relation to the center position 9. In the present case, the circumferential grooves 24-33 in each case have an identical depth which is radial in relation to the steering rod 3. In the present case, the center position 9 can be determined, for example, by virtue of the fact that the spacing between the circumferential grooves 28, 29 is detected, a center point of said spacing defining the center position 9.

Here, an information item that the detected spacing and the center point of said spacing are assigned to the center position 9 is preferably stored in the control unit 15.

For more precise detection of the slide position and/or slide direction, the steering device 1 in the present case preferably additionally has at least one further first sensor device 22. The latter is preferably configured in accordance with the first sensor device 6. As a result, it is possible, in particular, to determine the slide position at a further point of the steering rod 3. Here, the first sensor device 6 is assigned to the region to the left of the center position 9, and the further first sensor device 22 is assigned to the region to the right of the center position 9. In the present case, the first sensor device 6 and the further first sensor device 22 in each case detect sensor signals, represented in the sensor signal profile 34.

If the first sensor device 6 detects, for example, that in the case of a displacement of the steering rod 3 to the left (along arrow 17) from a first circumferential groove 26 to a further first circumferential groove 27 the width of the circumferential groove 27 decreases in comparison with the circumferential groove 26, the further first sensor device 22 will at the same time detect that the width of a second circumferential groove increases in comparison with a further second circumferential groove 30.

It is therefore possible by means of the sensor signals which are detected by way of the first sensor devices 6, 22 or the sensor signal profile 34 and by means of that rotor position of the rotor 6 which is detected or can be detected by way of the second sensor device 49 to determine the slide position and the direction with respect to the center position 9 particularly accurately, and to correspondingly actuate the drive unit 4 by way of the control unit 15, in order to displace the steering rod 3 with respect to the center position 9 as required. In particular, this minimizes the risk that the steering rod 3 is moved in an uncontrolled manner into a mechanical end position (what is known as "vise effect"), in particular, in the case of starting up of the vehicle 2. Here, the mechanical end position is the position which can be achieved by the steering rod 3 in the case of an outermost displacement, that is to say in the direction of the arrows 16 and/or 17.

The steering rod 3 optionally has a constant diameter in the longitudinal direction, a sleeve which has the plurality of circumferential grooves 24-33 being arranged on the steering rod.

Figure 5:
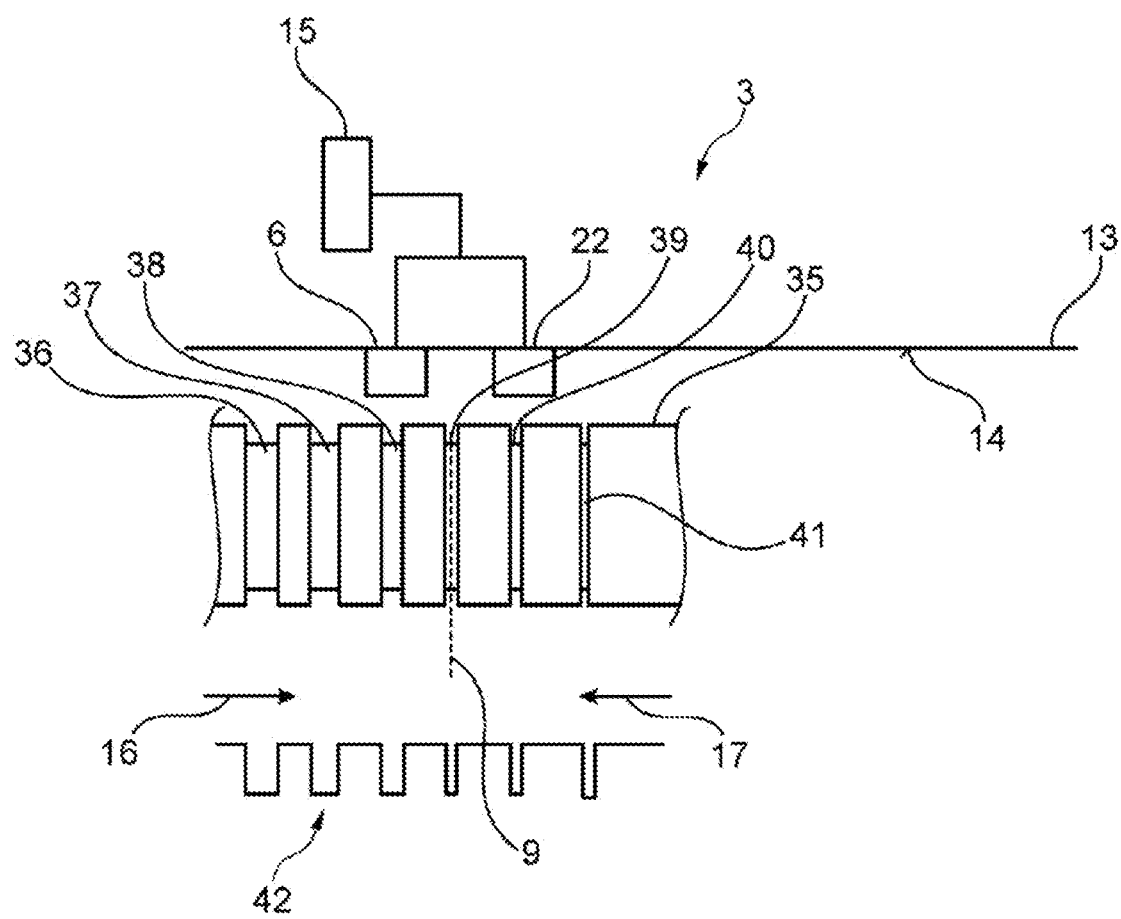
FIG. 5 shows a detail of a steering rod which has a change in its cross section, in a fourth embodiment.

FIG. 5 shows the steering rod 3, the steering rod 3 then having a plurality of circumferential grooves 36-41. Here, the present arrangement of the circumferential grooves 36-41 differs from that arrangement of the circumferential grooves 24-33 which is known from FIG. 4.

Starting from the center position 9 which is realized by way of a predefinable circumferential groove, in the present case the circumferential groove 39, the spacing of the circumferential grooves 36-38 decreases in the first direction, in particular the direction to the left of the center position 9 (along arrow 17), and the width of the circumferential grooves 36-38 increases. In the second direction (along arrow 16) which is opposed to the first direction, in particular the direction to the right of the center position 9, the spacing of the circumferential grooves 40, 41 increases and the width of the circumferential grooves 40, 41 decreases. As viewed in the longitudinal extent of the steering rod 3, in the present case from the first to the second direction, the widths of the circumferential grooves 36-41 decrease and the spacing of in each case two adjacent circumferential grooves 36-41 increases. The center position 9, realized by way of the circumferential groove 39, can be determined, for example, by way of the control unit 15 by virtue of the fact that the width of the circumferential groove 39 is known. The center position 9 can therefore be extrapolated in the case of a detection of a sensor signal which corresponds to the width of the circumferential groove 39. For particularly accurate positioning of the steering rod 3, in particular in the center position 9, the rotor position or current rotor position of the rotor 3 is additionally set in such a way that it corresponds, in particular, to the known setpoint rotor position which is stored in the control unit 15 and/or in the data storage unit.

A corresponding sensor signal profile 42 which is preferably detected by way of two first sensor devices 6, is furthermore shown. It can also optionally be provided here that the steering rod 3 has a constant diameter in the longitudinal direction, a sleeve 35 which has the plurality of circumferential grooves 36-41 being arranged on the steering rod.

The widths, spacings and/or depths of the circumferential grooves 24-33 can be stored or are stored preferably in the control unit 15, in particular the data storage unit of the control unit 15. As a result, it is possible, for example, if a width of a circumferential groove is detected, to compare said width with a stored width by means of the control unit 15, it being possible for the exact slide position to be determined when the detected width coincides with the stored width.

The steering device 1 ensures that a plausibility check of the center position 9 can be carried out during running operation of the vehicle 2. A slide direction with respect to the center position 9 can be determined, in particular, by way of the software algorithm of the control unit 15 as a result of the type of a mechanical coding, for example realized by way of the circumferential grooves which are configured on the steering rod 3 and/or sleeve 23, 35. The determination takes place here during the running operation or else directly after starting up or switching on of the steering device 1. As a result, in particular, mechanical jamming and/or the above-mentioned vise effect are/is prevented.

By way of the interaction of the first sensor device 6, and/or an index sensor and the second sensor device 49, the position of the steering rod 3 can be determined precisely and can be actuated particularly accurately as required by way of the control unit 15. In particular the position, in particular the center position 9, can be determined even in the case of a functional inoperability or a data loss, for example, of an optionally provided revolution counter of the steering device 1, which revolution counter is configured to count or to detect, in particular, complete revolutions of the rotor 3. It is thus known or can be determined on the basis of the sensor signals of the first sensor device 6, 22 in which position the steering rod is currently situated and in which direction the steering rod 3 has to be displaced, in order to reach the center position 9. Here, the steering rod 3 is displaced, in particular, in the direction of the center position 9 until the first sensor device 6, 22 detects the center position 9, for example by way of the detection of a width of a circumferential groove or change in the cross section of the steering rod which characterizes the center position 9. It is preferably provided that the electric motor or the rotor is additionally actuated here by way of the control unit 15 in such a way that the rotor position and/or actual rotor position which is detected by way of the second sensor device 49 correspond/corresponds to the setpoint rotor position. As a result of the combination of the first and the second sensor device 6, 22, 49, the use, for example, of an expensive linear position sensor is therefore not necessary.

It is preferably additionally provided to evaluate a number of complete revolutions of the rotor 3, which number is detected by the revolution counter, in order to determine the slide position and/or a displacement travel of the steering rod 3. In particular, the number of detected revolutions, the detected actual rotor position and the sensor signals of the first sensor device are then evaluated in order to determine the slide position. Here, the revolution counter is preferably connected electrically to the control unit 15.

The invention claimed is:

1. A steering device for a vehicle, comprising:
   a steering rod having at least one change in cross section along a longitudinal extent of the steering rod, the at least one change in cross section including at least one circumferential groove;
   at least one drive unit configured to displace the steering rod along the longitudinal extent of the steering rod; and
   at least one first sensor device configured to determine a slide position of the steering rod, the first sensor device being configured to detect the change in cross section, wherein the at least one circumferential groove includes a plurality of circumferential grooves.

2. The steering device as claimed in claim 1, wherein one predefinable circumferential groove of the plurality of circumferential grooves is assigned to a center position, which corresponds to a straight ahead driving position of steered wheels of the vehicle.

3. The steering device as claimed in claim 2, wherein
   a detected number of circumferential grooves are detected upon displacement of the steering rod from the center position such that at least one of a displacement travel and at least one of:
   a distance from the center position is determined based on the detected number of circumferential grooves, and at least one of a slide position and a slide direction relative to the center position is determined based on at least one of (a) a width of the detected circumferential grooves, (b) a depth of the detected circumferential grooves, and (c) a spacing between the detected circumferential grooves.

4. The steering device as claimed in claim 2, wherein the plurality of circumferential grooves have different widths.

5. The steering device as claimed in claim 4, wherein the widths of respective circumferential grooves of the plurality of circumferential grooves increases or decreases along the longitudinal extent of the steering rod.

6. The steering device as claimed in claim 4, wherein whether the slide position is moving away from the center position or is approaching the center position is determined based on an increase or decrease in the widths of at least two adjacent circumferential grooves of the plurality of circumferential grooves.

7. The steering device as claimed in claim 2, wherein the plurality of circumferential grooves have different depths.

8. The steering device as claimed in claim 7, wherein whether the slide position is moving away from the center position or is approaching the center position is determined based on an increase or decrease in the depths of at least two adjacent circumferential grooves of the plurality of circumferential grooves.

9. The steering device as claimed in claim 2, wherein the plurality of circumferential grooves are spaced apart from adjacent circumferential grooves by different distances.

10. The steering device as claimed in claim 9, wherein the spacing between adjacent circumferential grooves increases or decreases along the longitudinal extent of the steering rod.

11. The steering device as claimed in claim 9, wherein whether the slide position is moving away from the center position or is approaching the center position is determined based on an increase or decrease in the spacing of at least three adjacent circumferential grooves of the plurality of circumferential grooves.

12. The steering device as claimed in claim 2, wherein, starting from the one predefinable circumferential groove assigned to the center position, the circumferential grooves extend in both directions along the longitudinal extent of the steering rod.

13. The steering device as claimed in claim 12, wherein the at least one first sensor device further comprises:
at least one second sensor device configured to determine the slide position of the steering rod, the at least one first sensor device assigned to a first direction along the longitudinal extent and the at least one second sensor device assigned to a second opposite direction along the longitudinal extent.

14. The steering device as claimed in claim 13, wherein:
the drive unit includes an electric motor, and
the steering device further comprises at least one third sensor device configured to detect a rotor position of the electric motor.

\* \* \* \* \*